United States Patent [19]
Hollenbach

[11] Patent Number: 5,853,019
[45] Date of Patent: Dec. 29, 1998

[54] EARTHQUAKE ACTIVATED VALVE

[76] Inventor: Charles J. Hollenbach, 10101 Main St., Richmond, Ill. 60071

[21] Appl. No.: 889,336

[22] Filed: Jul. 8, 1997

[51] Int. Cl.⁶ ................................................. F16K 17/36
[52] U.S. Cl. .............................................. 137/38; 251/65
[58] Field of Search ................................. 137/38; 251/65

[56]  References Cited

U.S. PATENT DOCUMENTS

| | | |
|---|---|---|
| 3,407,827 | 10/1968 | Follett .................................. 251/65 X |
| 3,747,616 | 7/1973 | Lloyd ...................................... 137/38 |
| 3,830,252 | 8/1974 | Follett .................................. 251/65 X |
| 4,278,102 | 7/1981 | Kelley et al. . |
| 4,715,394 | 12/1987 | O'Donnell et al. . |
| 4,799,505 | 1/1989 | Nowell . |
| 4,860,780 | 8/1989 | Fisher . |
| 5,062,440 | 11/1991 | Korabiak . |
| 5,115,829 | 5/1992 | Franzke ...................................... 137/38 |
| 5,209,252 | 5/1993 | Perle . |
| 5,209,454 | 5/1993 | Engdahl et al. ...................... 137/38 X |
| 5,388,606 | 2/1995 | Banks . |
| 5,601,108 | 2/1997 | Perry . |
| 5,620,022 | 4/1997 | Manoogian . |

*Primary Examiner*—Gerald A. Michalsky
*Attorney, Agent, or Firm*—Mathew R. P. Perrone, Jr.

[57] ABSTRACT

An earthquake activated valve assembly is attached to a gas line downstream of a gas meter. The valve assembly has a ball check which rolls to a closed position for the valve upon agitation, by for example an earthquake.

11 Claims, 3 Drawing Sheets

EARTHQUAKE ACTIVATED VALVE

This invention relates to a valve and more particularly to a valve assembly adapted to close and shut off a line, especially a gas line during an earthquake.

BACKGROUND OF THE INVENTION

Typical gas shut-off valves designed for earthquake use contain an exteriorly exposed resetting mechanism. Such exterior exposure permits corrosion of the valve and inhibits the use of the resetting device. These devices also inherently include flow restrictions for the flow of the natural gas through the pipeline. Such flow restrictions can be as dangerous as an improper shut-off. It is desirable to avoid exterior exposure to the resetting of the shut-off valve and to minimize flow restriction problems.

It is furthermore desirable to reduce the moveable parts of the device. Springs, pendulum devices and other devices create additional moving parts, which can malfunction in the case of a problem. Bushings or seals to permit a proper fitting have a problem because friction is created and interfere with the holding of the device.

It is also desirable to level the device. If the appropriate leveling can be achieved the shut-off valve is more effective. An efficient mechanism to level the device at installation is very useful for the purpose of simplifying the installation in encouraging the use of the valve.

It is also desired that the shut-off valve not be bulky or subject to the outside disturbance, which can interfere with its working at the desired time. Bulky valves create a problem, by the space consumed alone. The moving parts thereof can improperly interact and prevent proper functioning of the valve during a earthquake.

SUMMARY OF THE INVENTION

Among the many objectives of this invention is to provide an earthquake activated valve assembly that closes and shuts off the flow of a line, especially a gas line.

Another objective of this invention is to provide an earthquake activated valve assembly that contains an interior resetting mechanism.

Yet another objective of this invention is to provide an earthquake activated valve assembly, which minimizes undesirable flow restrictions.

Still another objective of this invention is to provide a earthquake activated valve assembly which contains few movable parts.

Additionally, an objective of this invention is to provide a earthquake activated valve assembly that is not bulky in order to reduce the valve's interference with other parts of the line.

Also, an objective of this invention is to provide an earthquake activated valve assembly, which stays in a level position.

A further objective of this invention is to provide a method for easily installing an earthquake activated valve assembly in a level position.

These and other objectives of the invention (which other objectives become clear by consideration of the specification, claims and drawings as a whole) are met by providing an earthquake activated valve assembly to be attached to the gas line downstream of the gas meter, the valve assembly having a ball check which rolls to a closed position for the valve upon agitation, by for example an earthquake.

BRIEF DESCRIPTION OF DRAWINGS

Throughout the figures of the drawings where the same part appears in more than one figure the same number is applied thereto.

DESCRIPTION OF THE PREFERRED EMBODIMENTS

Figure 1:
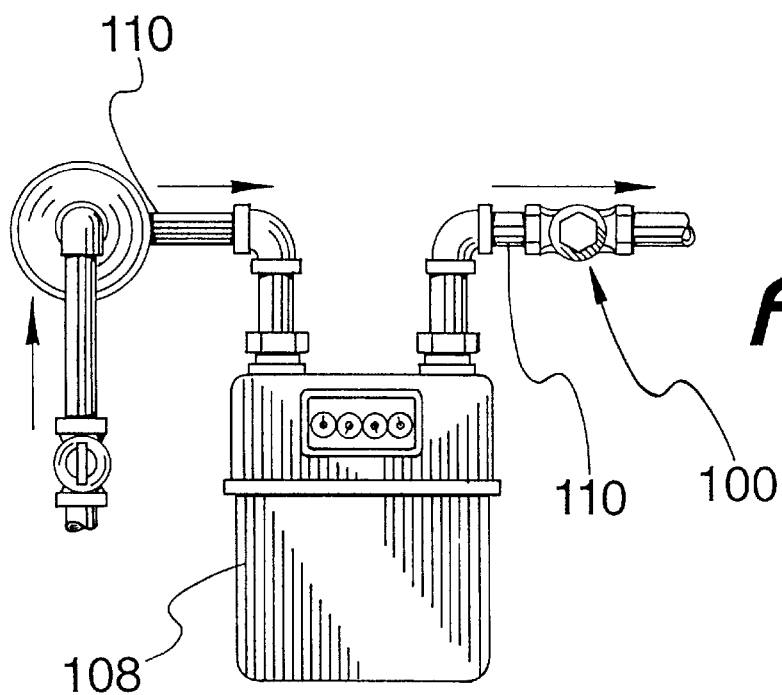
FIG. 1 depicts a side view of an earthquake activated valve assembly 100 mounted in a metered gas line 110.

This particular invention relates to a magnet supported, gravity shutoff, mechanism for the valve assembly. A ball is mounted in a sleeve of the valve assembly. Upon agitation such as by an earthquake, the ball rolls down the slot and is magnetically attached to the shut-off point. The magnet can be formed from any suitable rare earth metal or other long life magnetic. If desired, a rubber sheath can be placed over the magnetic to protect it from striking by the ball. With the leveling device and structure of the valve assembly, it is easy to mount the valve assembly in a gas line as desired.

The liner to support the ball prior to the setting of to the magnetic is fit in the valve assembly snug but not tightly. This permits the liner to be removed so that the valve assembly may be simply reset. It is possible to provide a gripping aperture which may be gripped by a hook or a wire or other desired place in order to remove the liner so that the ball can be retrieved from blocking valve assembly and permitting the valve assembly to be in place.

The main requirement of the valve housing is that it be non magnetic or non metallic, so that the metallic aspect of the ball shut-off can work. The valve housing may be conceivably formed of suitable heavy duty plastic or non-magnetic metal. The main requirement of the housing is that it be non magnetic or non magnetizable.

It is especially desirable that if a screen is present to catch debris to prevent further problems. In the supply pipe may also be a drop pipe to stop the garbage or debris from attacking the valve assembly and thence the line. The metallic ball rolling to the magnet is preferred to a magnetic ball because of the inherent polarity of a magnetic ball. In this fashion, the ball can be rolled more efficiently and achieve the desired results. The polarity in the magnetic interferes with such an action.

Preferably because of the heavy duty hardness of the magnet, it is subject to chipping. The magnet may be protected by a thin rubber gasket or similar material so the magnetic power is not adversely affected by chipping of the magnet. The ball may be then held thereby, while at the same time avoiding the chipping aspect danger of the magnet.

The particular parts used to form this shut off valve, for the most part, are standardly available parts which may be adapted as desired. One special design herein is found in the ball sleeve. The primary use of the valve assembly is in earthquakes. The valve assembly can also be used in high pressure gas lines, such as gas mains.

An especially desired valve housing is a brass housing. The housing has a pair of co-axial openings in a tubular arrangement. These co-axial openings provide an inlet and outlet for the valve. Substantially perpendicular to the tubular portion of the housing is a shutoff tube with an access aperture.

Mounted in the first coaxial opening, which serves as a valve inlet, is an apertured magnet. Thus the magnet has a donut or tire shape. The rim of the magnet fits in the first coaxial opening. Over the magnet is mounted a form-fitting flexible member. The form fitting member protects the magnet from impact by the ball upon activation of the shut-off valve assembly. Neither the magnet nor the flexible member interfere with the functioning of the valve assembly.

The magnet is preferably formed from a rare earth metal. Such a material is durable but hard, with very long lasting magnetic capabilities. Because the hardness can lead to chipping and weakness due to ball check contact, a thin flexible sheet is applied over the magnet. Both the magnet and sheet have appropriate, preferably concentric apertures to avoid gas flow interference.

Oppositely disposed from the magnet and mounted in the housing at the second co-axial opening, or valve inlet, may be an optional screen. The screen serves to protect the valve assembly from debris in the gas line. The valve inlet and valve outlet may be reversed as to screen and magnet mounting. In this fashion, the gas shutoff may be reinforced by the gas flow forcing the ball into the magnet.

The shutoff tube provides a closeable opening, which communicates with the first coaxial opening, which serves as an inlet; and the second coaxial opening, which serves as the valve outlet. Slidably mounted in the shut-off tube is a support tube. Adjacent to the closeable opening in the support tube is a ball recess, to receive the ball check. The ball check is received by the magnet to complete the shutoff function of valve.

Extending from the recess in the support tube is an extended ball slot. During an earthquake, the ball is jarred from the recess, rolls down the slot, approaches the magnet, is attracted to the magnet, and secured to the magnet by the magnetic forces. Such a ball blocks the valve and stops the gas flow.

In the support tube, oppositely disposed from the ball recess, adjacent to the oppositely disposed end thereof, are a pair of co-axial apertures. These coaxial apertures permit the first coaxial opening to communicate with the second coaxial opening.

Figure 2:
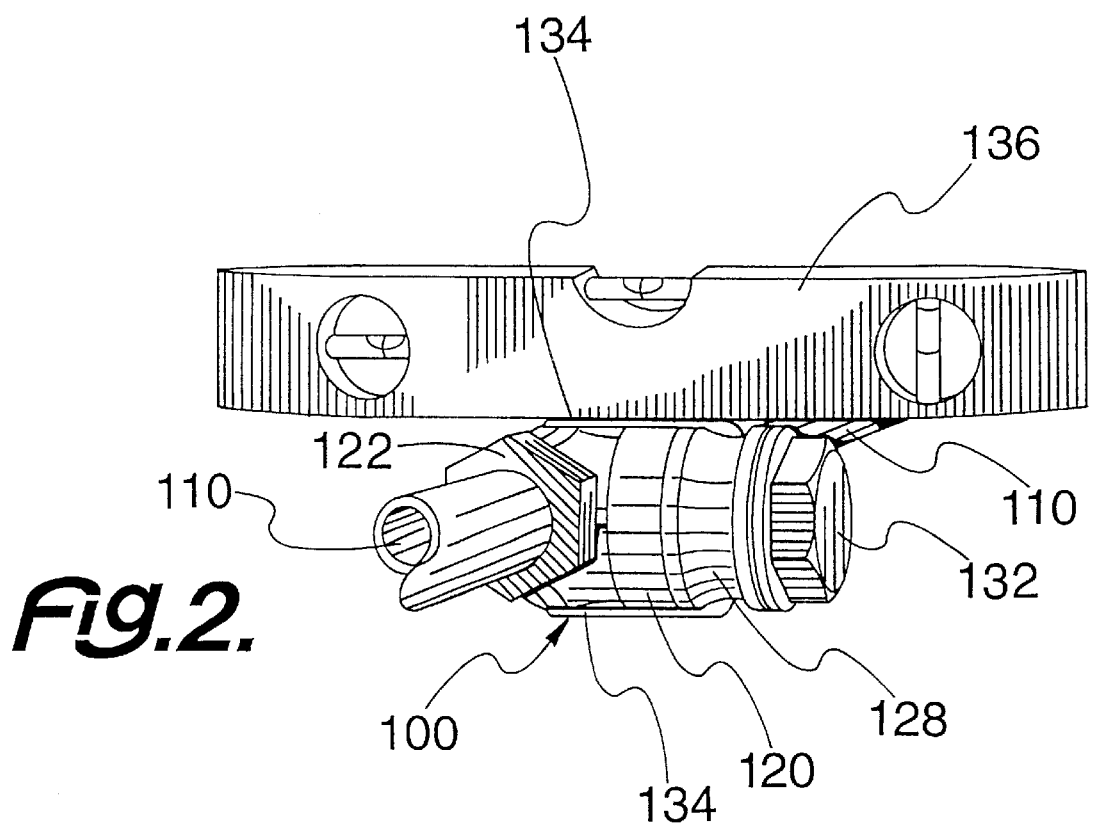
FIG. 2 depicts a front perspective view of the earthquake activated valve assembly 100.

Referring now to FIG. 1 and FIG. 2, an earthquake activated valve assembly 100 is mounted with a meter 108 in a gas line 110. Valve assembly 100 includes a valve housing 120 having an inlet 122 and an outlet 124. Inlet 122 receives gas. Outlet 124 permits gas to exit the valve housing 120. Inlet 122 and outlet 124 are preferably coaxial openings and tubular in arrangement.

Preferably and substantially perpendicular to the inlet 122 and an outlet 124 is a valve chamber or shutoff tube 128. Shutoff tube 128 has an access aperture 130. Access aperture 130 permits shutoff tube 128 to communicate with inlet 122 and an outlet 124. Shutoff tube 128 is closable with a bonnet 132 in threaded relation with access aperture 130. Between shutoff tube 128 and bonnet 132 may be a bonnet washer 138 to more completely seal valve housing 120. Bonnet 132 is preferably substantially solid, as opposed to hollow, in order to keep ball check 176 out of the bonnet 132.

On shutoff tube 128 is leveling panel 134. During a mounting procedure for the valve assembly 100, levelling panel 134 can receive a level indicator 136 to assist in a level installation for valve assembly 100. A level installation permits greater efficiency for valve assembly 100.

Figure 3:
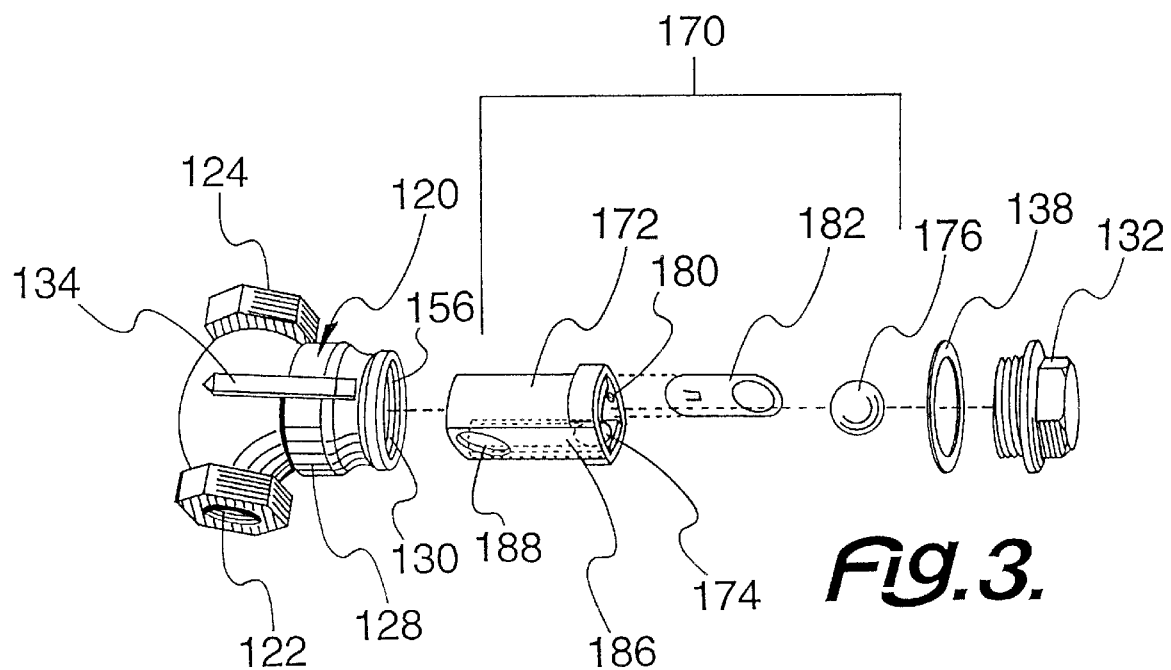
FIG. 3 depicts a side, exploded, front perspective earthquake activated valve assembly 100.
Figure 4:
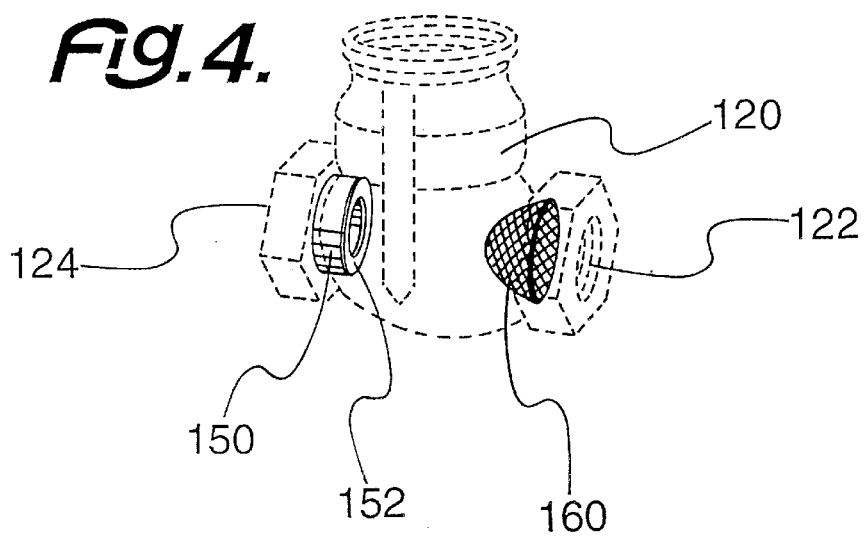
FIG. 4 depicts a phantom perspective view of earthquake activated valve assembly 100, showing magnet 150.
Figure 5:
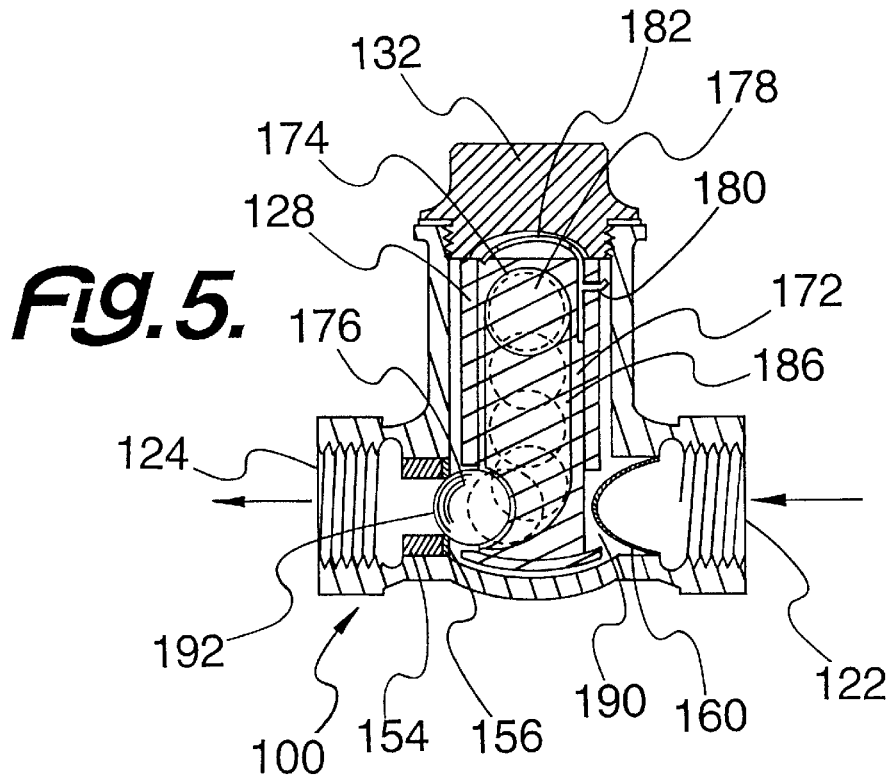
FIG. 5 depicts a side view of earthquake activated valve assembly 100, in partial cross-section.

Adding FIG. 3, FIG. 4, and FIG. 5 combine to cooperation of the parts of earthquake activated valve assembly 100, in partial cross-section. In inlet 122 is mounted magnet 150. Magnet 150 is snugly into inlet 122 and supported therein by a flexible magnet cover 152. Magnet aperture 154 and cover aperture 156 are both centrally located and do not interfere with gas flow.

In outlet 124 is a screen 160. Screen 160 traps solid debris or particles, which may be in the gas flowing through valve assembly 100. The position of screen 160 and magnet 150 may be reversed. The ball assembly 170 communicates and cooperates with shutoff tube 128.

Ball assembly 170 includes a ball sleeve 172. Ball sleeve 172 is slidably mounted in shutoff tube 128. Adjacent to bonnet 132 in ball sleeve 172 is a ball recess 174. Ball recess 174 receives ball check 176. With ball check 176 in ball recess 174, valve assembly 100 is in set position 178. Gas may easily flow through valve assembly 100 in set position 178 to its desired place of use.

Also on ball sleeve 172 adjacent to bonnet 132 is a grip aperture 180. The grip aperture 180 may receive any type of gripping device such as pull ring 182. Pull ring 182 is adapted to move valve assembly 100 back to set position 178.

Adjacent to and in communication with recess 174 is ball groove 186. Preferably grip aperture 180 is about forty five (45°) degrees to about one hundred eighty (180°) degrees disposed from ball recess 174. More preferably grip aperture 180 is about fifty (50°) degrees to about one hundred seventy (170°) degrees disposed from ball recess 174. Most preferably grip aperture 180 is about eighty (80°) degrees to about one hundred (100°) degrees disposed from ball recess 174.

Grip aperture 180 may have pull ring 182 or a similar device permanently or removably secured therein. If permanently secured, pull ring 182 is required to be stored in shutoff tube 128 of valve housing 120. If removably attachable to grip aperture 180, pull ring 182 is optionally stored in shutoff tube 128 of valve housing 120.

Opposite disposed from ball recess 174 in ball sleeve 172 is magnet sleeve aperture 188. Magnet sleeve aperture 188 communicates with flexible magnet cover 152. Oppositely disposed from magnet sleeve aperture 188 in ball sleeve 172 is outlet sleeve aperture 190. Magnet sleeve aperture 188 and outlet sleeve aperture 190 cooperate to permit gas to pass through valve assembly 100, when valve assembly 100 is in set position 178.

Valve assembly 100, in use, is installed in a gas line 110. The level position required for installation is provided by leveling panel 134 on valve housing 120, in general, shutoff tube 128, in particular.

Upon agitation of the valve assembly 100, such as by an earthquake for example, the ball check 176 ejects from recess 174 and rolls down the ball groove 186 into magnet sleeve aperture 188. Ball check 176 contacts with flexible magnet cover 152 and is held thereon by the magnetic attraction of magnet 150. With the ball check 176 in contact with magnet cover 152, the valve assembly 100 is in closed position 192.

Clearly ball groove 186 may be mounted horizontally or on an angle of up to about five (5°) from horizontal. Such an angle may be achieved by machining of ball sleeve 172 or positioning of valve housing 120 or combinations thereof.

Such an angle may add a gravitational force to the rolling of ball check 176.

Figure 6:
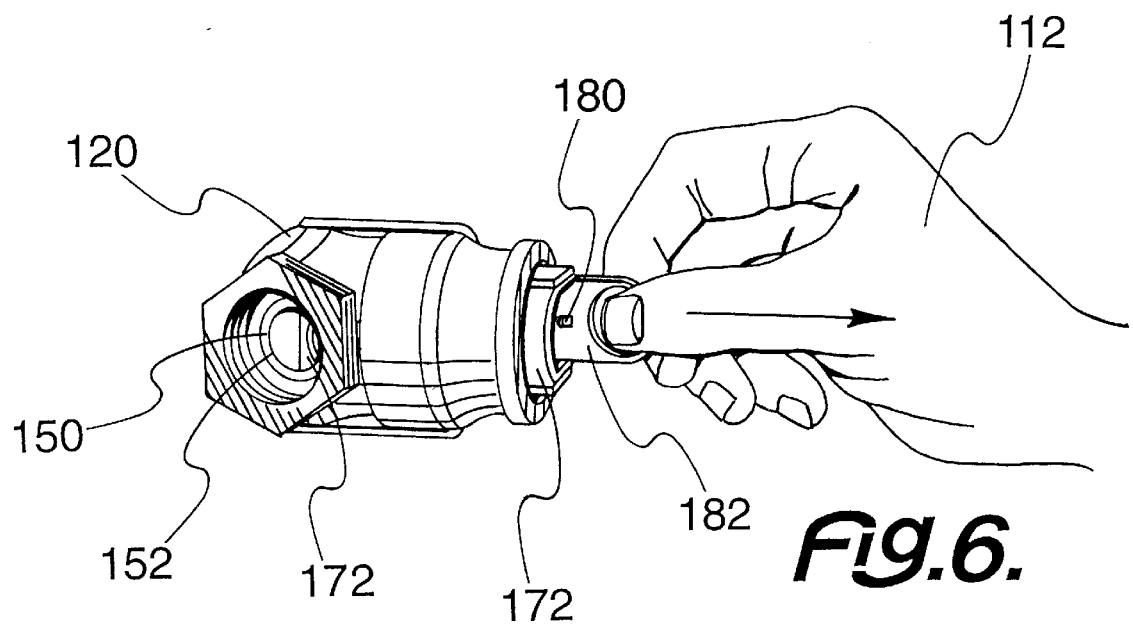
FIG. 6 depicts a side perspective view of an earthquake activated valve assembly 100, being reset.

From closed position 192, the valve assembly 100 may be moved to set position 178 as shown in FIG. 6. More particularly, with valve assembly 100 in closed position 192, when desired, bonnet 132 may be removed from valve housing 120. Pull ring 180 is gripped by hand 112. Ball sleeve 172 is at least partially removed from shutoff tube 132. Ball sleeve 172 is adapted to move valve assembly 100 back to set position 178.

Magnet sleeve aperture 188 grips the ball check 176 and breaks contact of ball check 176 with magnet 150, as the pull ring 180 is used. Ball check 176 may then be placed in recess 174. Bonnet 132 is replaced, and valve assembly is in set position 178.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by letters patent of the United States is:

1. A shut-off valve comprising:
   a valve housing, having inlet and outlet apertures communicating with a central valve chamber;
   a valve seat provided between the inlet aperture and the outlet aperture;
   a magnet, located in the inlet aperture, that covers the circumference of the inlet of the valve body, having an opening to allow flow through the inlet;
   a ball check, having metallic properties so that the ball check is attracted to the magnet, having a diameter relative to the size of the magnet so that the ball may provide a seal when attached to the magnet that prevents the flow of gas;
   a ball sleeve, which is snugly fitted into the central valve chamber, having an inlet opening and an outlet opening that do not restrict the flow of gas;
   a ball guide ramp, located on the bottom of the ball sleeve, and having a concave shape to guide the ball down to the magnet;
   a ball travel cradle to support the ball check rolling down the ball guide ramp by gravity alone, yet allows the ball to be displaced from the ball travel cradle due to agitation;
   a ball reset pull tab;
   a level rest formed on the valve housing, which provides a means for installing the valve body so that the ball guide ramp will be positioned so that if the ball check is displaced from the ball travel cradle, gravity will cause the ball check to traverse the ramp toward the magnet;
   an access bonnet removably secured to the central valve chamber; and
   a cover washer, located between the valve body and the access bonnet.
2. The shut-off valve of claim 1, wherein the valve body has a screen trap located at the inlet.
3. The shut-off valve of claim 1, further comprising a sheath made of rubber.
4. The shut-off valve of claim 1, wherein the ball housing is formed of at least one material selected from the group consisting of plastic and nonmagnetic metal.
5. A gas valve comprising:
   a valve housing having a shut-off means mounted within the housing;
   the shut-off means being adapted to close the gas valve and stop a flow of a gas through a line;
   the shut-off means being supported by a magnet;
   an agitating means for activating the shut-off means cooperating therewith;
   the agitating means being activated upon movement of the valve;
   a means for releasing the shut-off means in order to thereby reset the valve;
   the means for releasing the shut-off means being located in the interior of the valve; and
   a levelling means shaped on the housing for installing the valve in a level position.
6. The gas valve of claim 5 further comprising:
   a ball check being mounted in the valve housing;
   the magnet being mounted in the valve housing and spaced apart from the ball check;
   the magnet being mounted adjacent to an outlet in the valve housing; and
   a directing means guiding the ball check toward the magnet upon agitation to magnetically attach to the magnet.
7. The gas valve of claim 6 further comprising:
   the ball check being formed of a material that is attracted to the magnet to create a shut-off point for the flow of gas in the valve;
   a ball housing mounted in the valve housing for receiving the ball check;
   the ball housing being formed a non-magnetizable material; and
   a ball guide ramp being in the ball housing at a bottom portion of the ball housing in order to guide the ball down to the magnet.
8. The gas valve of claim 7, wherein the ball housing further consists essentially of a ball travel cradle, in which the ball check is mounted, that supports the ball check from rolling down the ball guide ramp by gravity alone, yet allows the ball check to be displaced from the ball travel cradle due to agitation.
9. The gas valve of claim 8, wherein the resetting means is consists essentially of:
   a gripping aperture, located on the ball housing; and
   the gripping aperture for pulling being adapted to remove the ball housing in order to retrieve the ball check from the magnet in order to permit the valve and ball check to be reset and to allow the flow of gas through the shutoff valve.
10. The gas valve of claim 9, wherein the magnet is a rare earth metal.
11. The gas valve of claim 10, further comprising a flexible sheath be placed over the magnet in order to protect the magnet.

* * * * *